Aug. 1, 1944.   H. J. OSTERMANN ET AL   2,354,964
LIQUID LEVEL SENSITIVE APPARATUS
Filed May 3, 1939

INVENTOR.
Hans J. Ostermann and Theodore A. Cohen
BY Theodore W. Miller
ATTORNEYS.

Patented Aug. 1, 1944

2,354,964

UNITED STATES PATENT OFFICE 2,354,964

LIQUID LEVEL SENSITIVE APPARATUS

Hans J. Ostermann and Theodore A. Cohen, Chicago, Ill., assignors, by mesne assignments, to Wheelco Instruments Company, Chicago, Ill., a corporation of Illinois Application May 3, 1939, Serial No. 271,565

9 Claims. (Cl. 73—304)

This invention relates to liquid level sensitive apparatus in general and more particularly to such apparatus adapted to perform various useful functions in accordance with variations in liquid level in a liquid container, and this application for patent therefor is a continuation in part of our copending application Ser. No. 267,326, filed April 11, 1939, for Liquid level sensitive apparatus.

The primary object of this invention is to provide an improved liquid level sensitive apparatus responsive to variations in liquid level and performing certain useful functions, such as recording and indicating liquid level changes, in accordance with such variations.

Other and further objects of this invention will be more apparent hereinafter from an examination of the specification and claims in conjunction with the accompanying drawing wherein:

Figure 1:
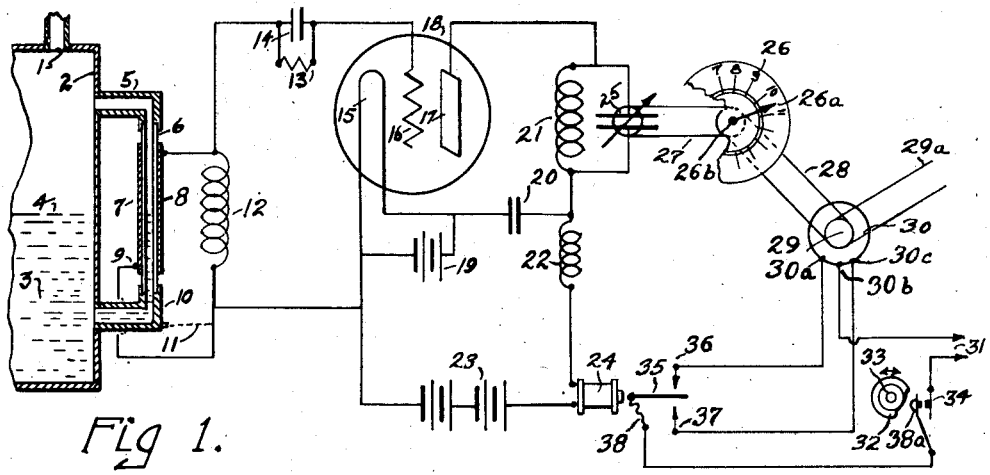
Fig. 1 represents a schematic view of a particular embodiment of the invention showing a liquid level sensitive apparatus responsive to variations of liquid level in a container such as a boiler, storage tank etc. and for performing various useful functions in accordance with such variations.

Referring to Fig. 1, reference character 1 designates the liquid input to a container 2 which may be a boiler, storage tank or the like. The container 2 contains liquid 3 at a variable level 4 and is provided with upper and lower gauge fittings 5 and 10, respectively, supporting therebetween a glass or non-metallic gauge tube 6.

A pair of fixed vertically extending metallic conductors 7 and 8 are provided on opposite sides of the glass 6 and act as condenser plates. They may be in the form of metal strips or they may be sprayed or plated on the tube 6. The liquid 3 in the glass 6 acts as a dielectric and any variation in level of said liquid correspondingly varies the capacity of the condenser formed by the conductors 7 and 8.

The conductors 7 and 8 are connected to the opposite sides, respectively, of a grid tank inductance 12 which together with the condenser formed by asid conductors constitutes said grid tank. This grid tank may be grounded as at 11 and has one side connected through a grid resistor 13 and a grid condenser 14 to the grid 16 of an oscillator tube 18 and the other side connected to the filament 15 of said tube. A filament heating source 19 is provided for filament 15. The oscillator tube has a plate 17 connected to one side of a plate tank comprising a plate tank inductance 21 and a variable plate capacity 25. The other side of the plate tank is connected to a plate power source 23 through an isolating choke coil 22 and a neutral position relay 24.

A coupling or by-pass condenser 20 is connected between the filament and a point between the choke coil 22 and the plate tank 21—25.

The tank 21—25 in the plate circuit is tuned to predetermined resonance with the grid tank 7—8—12, when the level 4 is at the chosen initial point; the tuning being so chosen that the plate current through the relay 24, at such initial point, is at such level as to keep the relay contact 35 in the neutral position shown. Should a liquid level change occur, the capacity change thereby produced will change the tuning of the grid tank 7—8—12 deresonating or reresonating same depending upon direction of liquid level change together with the plate tank 21—25; causing a change in plate current through relay 24 which thereupon makes contact 36 or 37 depending upon whether the liquid level has increased or decreased at 4. Thus the plate current will act upon relay 24 corresponding to variations in liquid level from said initial point to correspondingly control other means hereinafter described including means for restoring the predetermined resonance of the circuit.

The armature and contact plate 35 of the relay 24 is connected, preferably through a flexible conductor 38, and through an anti-hunting device 32—33—34—38a, to be more particularly described hereinafter, to one terminal of a source of current 31 for a reversing motor 30. The motor 30 is of a suitable type provided with a pair of field coils (not shown) having terminals 30a and 30c, respectively, and a common central terminal 30b. Contact 36 leads to terminal 30a and contact 37 leads to terminal 30c. Terminal 30b leads to the other terminal of source 31.

The grid and plate tanks being predeterminedly resonated with respect to each other to such extent as to provide an intermediate plate current level when the liquid level 4 is at the chosen initial point, armature 35 will assume a neutral position under such circumstances. When the liquid level is lowered from such point, the reduction in capacity thereby across the grid tank detuning the latter from the aforesaid predetermined resonant position with the plate tank and causing a rise in plate current above the aforesaid intermediate level, the armature 35 will contact with contact 36 to drive motor 30 in one direction; and when the liquid level is raised, armature 35 will contact with contact 37 by virtue of lowering of plate current below said intermediate level to drive said motor in the opposite direction.

The manner and means by which this motor 30, controlled as previously described, acts in turn to restore the tuning and balance of the oscillating circuit and operate other means, including liquid level indicating and recording devices, will now be described.

The motor 30 is provided with a pulley 29 and drive 28 therefrom, which may take any suitable form, connected to an indicator shaft 26b which in turn is drivingly connected by means of a suitable drive 27 to the shaft of variable plate tank condenser 25. The amount and direction that the indicator shaft 26b and plate tank condenser 25 shaft are operated depends upon the degree and direction of rotation of motor 30. When tank condenser 25 has been thus adjusted sufficiently to restore the predetermined resonant condition of the oscillating circuit, a pointer 26a on shaft 26b will indicate the new liquid level on a dial 26 calibrated in liquid column height and the motor 30 will stop, because the relay 24 will be restored to neutral position. Thereafter any deviation in liquid level from the new liquid level will similarly unbalance the oscillating circuit with resultant restoration and indication in the same manner.

The reversing motor 30 may be coupled to a recording mechanism and other devices either in the manner shown in our copending application Ser. No. 267,326, filed April 11, 1939, for Liquid level sensitive apparatus, or by means of a coupling or drive 29a, and such liquid level recording mechanism and safety devices operable in accordance with liquid level changes may take the same form as shown in said copending application.

The anti-hunting device, previously referred to, may take any suitable form and be placed in any suitable part of the electrical circuit or mechanism but is here shown comprising a cam 32 on a suitably timed drive shaft 33. An interrupter having stud 38a and contact 34 is operated at timed intervals by the cam 32 and introduces a time lag which prevents recurrent cycling or hunting in the apparatus as a whole.

Figure 2:
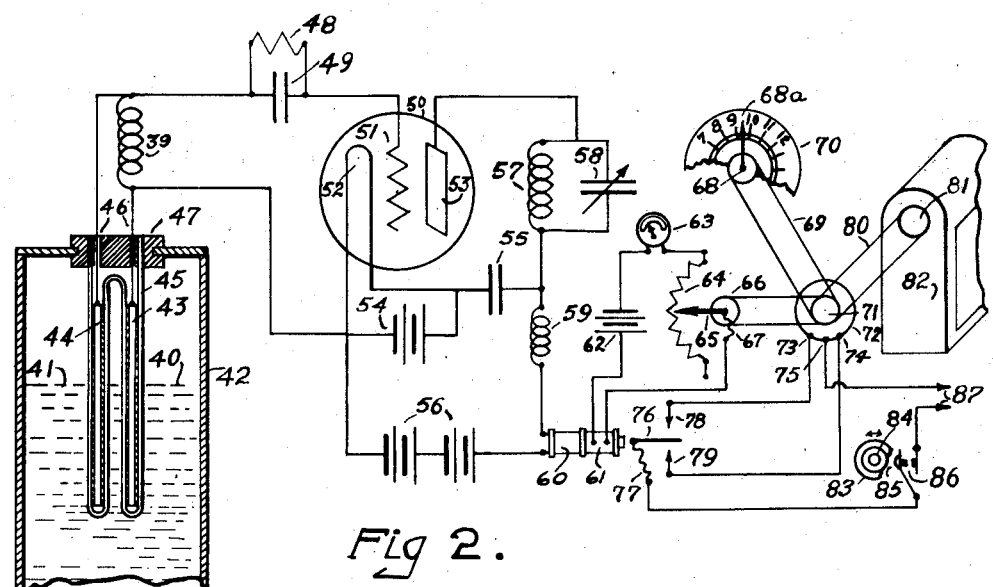
Fig. 2 represents a similar view of a modification.

Referring to Fig. 2, there is here shown a somewhat similar form of the invention, except that here the liquid level sensitive device, adapted to unbalance the oscillating circuit in accordance with the liquid level changes, is of the immersion type and also, in this embodiment, the oscillating circuit itself is not restored to balance by the reversing motor. Instead a differential relay is used in the plate circuit and the change in plate current from predetermined intermediate level due to liquid level changes is counteracted and neutralized during the restoration operation by the reversing motor whereby the effect of the unbalance of the plate current on the relay is neutralized and the relay in rebalanced to stop the reversing motor and the indicator pointer at the new level.

The oscillating circuit, in this embodiment, is adapted to be unbalanced by the liquid level sensitive device in accordance with liquid level changes from the predetermined initial point, and it will remain unbalanced unless and until that point is resumed and the liquid level sensitive device in response to such resumption in level has effected such rebalance. But the relay itself is rebalanced after each change in liquid level as will be more particularly described hereinafter.

More particularly there is shown a container 42 with liquid 41 therein at a variable level 40. A glass or otherwise non-metallic hollow member 45 depends from a non-metallic annular supporting fitting 47 mounted in an opening in the top of container 42. The hollow member 45 is sealed at its lower end to exclude liquid and is partly immersed therein. It is shaped to provide a pair of opposite chambers for supporting therein a pair of vertically extending and horizontally spaced capacity elements 44 and 43. Here likewise the water in the container acts as a dielectric and the elements 43 and 44 act as plates of a condenser. These elements 43 and 44 act substantially the same as elements 7 and 8 of the previous embodiment and are likewise connected, respectively, to opposite sides of the grid tank inductance 39, corresponding to the inductance 12 in said previous embodiment. Parts 48, 49, 50, 51, 52, 53, 54, 55, 56, 57, 58, 59, and 60 are similar to corresponding parts 13, 14, 18, 16, 15, 17, 19, 20, 23, 21, 25, 22, 24, respectively, in the previous embodiment, except that here the plate tank condenser 58 is not motor driven and the relay 60 is differentially wound with an additional coil 61 thereon adapted when energized to counteract and neutralize the effect of the plate current in the first coil thereof. Parts 68, 68a, 69, 70, 71, 72, 73, 74, 75, 76, 77, 78, 79, 80, 83, 84, 85, 86, and 87 are similar to corresponding parts 26b, 26a, 28, 26, 29, 30, 30a, 30c, 30b, 35, 38, 36, 37, 29a, 32, 33, 38a, 34 and 31, respectively, except that the indicator shaft 68 has no driving connection to the plate tank condenser. Instead reversing motor 72 is suitably connected to drive a rotatable contact member 65 of a rheostat to vary the amount of resistance 64 in circuit with the counter-winding 61 of the differential plate relay. A source of current 62 is provided for such circuit and also an ammeter 63 calibrated in liquid column height. A recording apparatus 82 similar to that previously referred to in the former embodiment and in our copending application aforesaid together with safety devices as also shown in said copending application may be driven from said drive 80 from the reversing motor.

The amount and direction that the rheostat finger 65 must be moved by the reversing motor to sufficiently energize or deenergize the counteracting coil 61 in the differential relay to balance the plate current in coil 60 to cause it to resume the neutral position shown and stop said motor after a liquid level change has occured is a measure of the extent of said change and indicative of the new level. Thus the finger 65 may itself be an indicating pointer and the ammeter 63 an indicator both showing liquid level changes as well as indicator 68—68a—70. In this embodiment, when a liquid level change occurs, the capacity change thereby produced across the grid tank will change the tuning thereof deresonating or reresonating, as the case may be, same together with the plate tank; causing a corresponding change in plate current through relay coil 60 which thereupon makes contact 78 or 79 depending upon whether the liquid level has increased or decreased at 40.

Figure 3:
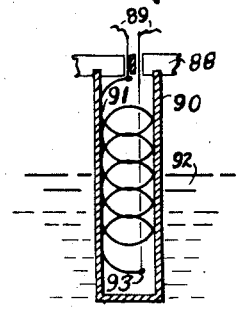
Fig. 3 is a detail fragmentary sectional view of a modified form of liquid level sensitive inductance device capable of use in either of the circuits of Figs. 1 and 2 in lieu of the liquid level sensitive capacity device shown therein.

Referring particularly to Fig. 3, there is here shown a modified form of liquid level sensitive inductance device of the immersion type adapted to be inserted in liquid to cooperate with the previous circuits in lieu of the liquid level sensitive capacity devices shown therein. Herein is shown a hollow immersed member 90 sealed at its lower end to exclude the liquid 92 in the container (not shown). This member corresponds to member 45 in the previous embodiment and likewise is depending from a non-metallic fitting 88. In this case, however, a vertically arranged inductance coil 91 is mounted in the hollow immersion member instead of capacity members such as 43—44. Inductor leads 89 are connected to the terminals, including lower terminal 93, of the coil 91. When this liquid level sensitive inductance device, including member 90 with coil 91 therein, is used instead of the device, including member 45 with capacity members 43—44 therein, in either circuit previously described, said coil 91 may take the place of either of the following inductances: 39, 12, 21, or 57 to unbalance the respective circuits in accordance with liquid level changes in the same manner as the liquid level sensitive capacity devices in said circuits so function.

The oscillator circuits may take a variety of forms and the liquid level sensitive inductance and/or capacity devices shown may be placed in other parts of said circuits than across the grid tanks as shown.

Where the term "electrical reactive" is used in the appended claims it is intended to cover generically either capacitive reactance, inductive reactance or both.

We are aware that many changes may be made and details varied without departing from the principles of our invention and we therefor do not wish to be limited to the details shown or described.

We claim:

1. In an apparatus of the character described, the combination of a liquid container, a pair of spaced metallic members out of direct electrical contact with the liquid in the container and extending a substatnial distance above and below a predetermined level of the liquid in such position that change in said level will correspondingly vary the capacity between said members, an electronic oscillator connected to said members for detuning thereby and means, controlled in turn by said oscillator, for automatically returning the oscillator and indicating the new liquid level.

2. In an apparatus of the character described, liquid level sensitive means, an electrical circuit adapted to be unbalanced thereby, a relay in said circuit and control means responsive to said relay for automatically restoring the same independently of such unbalance of the circuit.

3. In an apparatus of the character described, liquid level sensitive means, an electrical circuit adapted to be unbalanced thereby, a differential relay having counteracting coils, one coil in said circuit and a control circuit containing the other coil and controlled by said first circuit for automatically rebalancing said relay.

4. In an apparatus of the character described, liquid level sensitive means, an electrical circuit adapted to be unbalanced thereby, a relay in said circuit and means responsive to said relay for automatically restoring the same independently of such unbalance of the circuit and for indicating liquid level change.

5. In an apparatus of the character described, liquid level sensitive means, an electrical circuit adapted to be unbalanced thereby, a relay in said circuit and means responsive to said relay for automatically restoring the same independently of such unbalance of the circuit and for recording liquid level change.

6. In an apparatus of the character described, liquid level sensitive variable electrical reactive means, an electrical circuit adapted to be unbalanced thereby, a relay in said circuit and means responsive to said relay for automatically restoring the same independently of such unbalance of the circuit.

7. In an apparatus of the character described, liquid level sensitive variable electrical reactive means, an electrical circuit adapted to be unbalanced thereby, a differential relay having counteracting coils, one coil in said circuit, and a control circuit containing another coil and controlled by said first circuit for automatically rebalancing said relay.

8. In an apparatus of the character described, liquid level sensitive variable electrical reactive means, an electrical circuit adapted to be unbalanced thereby, a relay in said circuit, a second circuit adapted to be controlled by said relay and including a prime mover and a third circuit controlled by said prime mover for automatically counteracting the degree of unbalance of said relay.

9. In an apparatus of the character described, liquid level sensitive means, an electrical circuit adapted to be unbalanced thereby, a differential relay having a pair of counteracting coils, one coil in said circuit, a second circuit containing the other coil and controlled by said first circuit for automatically rebalancing said relay and means responsive to the second circuit for indicating liquid level changes.

HANS J. OSTERMANN.
THEODORE A. COHEN.